(12) United States Patent
Day et al.

(10) Patent No.: US 11,243,107 B2
(45) Date of Patent: Feb. 8, 2022

(54) DEVICE AND METHOD FOR IMPROVED SPRAY MONITORING

(71) Applicant: Spraying Systems Co., Wheaton, IL (US)

(72) Inventors: Andrew Day, North Aurora, IL (US); Alexander Chirban, Wauwatosa, WI (US); Tim Hennessy, Plainfield, IL (US)

(73) Assignee: Spraying Systems Co., Wheaton, IL (US)

( * ) Notice: Subject to any disclaimer, the term of this patent is extended or adjusted under 35 U.S.C. 154(b) by 0 days.

(21) Appl. No.: 16/079,692

(22) PCT Filed: Jul. 31, 2018

(86) PCT No.: PCT/US2018/044667
§ 371 (c)(1),
(2) Date: Aug. 24, 2018

(87) PCT Pub. No.: WO2019/028061
PCT Pub. Date: Feb. 7, 2019

(65) Prior Publication Data
US 2021/0190563 A1    Jun. 24, 2021

Related U.S. Application Data

(60) Provisional application No. 62/538,848, filed on Jul. 31, 2017.

(51) Int. Cl.
*G01F 1/698*    (2006.01)
*B05B 12/00*    (2018.01)

(52) U.S. Cl.
CPC ............ *G01F 1/698* (2013.01); *B05B 12/006* (2013.01)

(58) Field of Classification Search
CPC ..... G01F 1/698; G01F 23/284; B05B 12/006; G01L 9/0027; G05D 7/0635
See application file for complete search history.

(56) References Cited

U.S. PATENT DOCUMENTS

| | | | | |
|---|---|---|---|---|
| 5,718,767 A * | 2/1998 | Crum | ................. | G05B 19/4148 118/669 |
| 2016/0178422 A1 * | 6/2016 | Humpal | ................ | A01M 7/006 239/71 |
| 2016/0252912 A1 * | 9/2016 | Horwitz | .................... | G01F 1/86 137/2 |
| 2017/0120263 A1 * | 5/2017 | Needham | ............. | G05D 7/0635 |
| 2019/0210052 A1 * | 7/2019 | Baker | ...................... | H01L 51/56 |
| 2019/0275990 A1 * | 9/2019 | Agrotis | ................... | B60S 1/486 |
| 2019/0321844 A1 * | 10/2019 | Schrader | ................ | A01B 79/02 |

* cited by examiner

*Primary Examiner* — Francis C Gray
(74) *Attorney, Agent, or Firm* — Leydig, Voit & Mayer, Ltd.

(57) ABSTRACT

A spraying apparatus having an improved system for monitoring the flow of a spray nozzle or spray device and sensing malfunctions to the spray device is provided. The spraying apparatus includes sensors to monitor an input or instruction signal and a spray signal. The timing of the signals are analyzed to verify whether the spraying apparatus is opening and closing properly for each spray instruction signal.

21 Claims, 15 Drawing Sheets

DEVICE AND METHOD FOR IMPROVED SPRAY MONITORING

CROSS-REFERENCE TO RELATED APPLICATIONS

This patent application claims the benefit of U.S. Provisional Patent Application No. 62/538,848, filed Jul. 31, 2017, which is incorporated by reference.

FIELD OF INVENTION

The present application relates generally to a liquid spraying apparatus and, more particularly, to a spraying apparatus having an improved system for sensing and monitoring liquid flow and/or faulty operation of spray nozzles of the spraying apparatus.

BACKGROUND

Over time, operation and performance of nozzles of a spray apparatus can become faulty, through partial or complete blockage of flow passages, wear of the nozzle parts, or damage, resulting in uneven or ineffective application of spray liquid. In addition, an operator may be unaware of the faulty spray performance at the time of application. Re-application of the spray liquid may be time-consuming and costly and poor performance could lead to poor product quality, loss of product or damage to equipment. In addition, damage to the spray nozzles could result in excessive application of the spray liquid.

In the past, different technologies have been proposed that operate to determine when a spray tip is plugged or worn. Such systems, however, have not been reliable in meeting the needs of operators seeking to monitor clogging or malfunction of spray nozzles.

Verification of a spray application is desirable in that it assures customers that their processes, especially in an automated manufacturing environment, are working properly, and product quality, tool life, etc. will not be hampered by missed sprays.

Optical sensors to sense the spray exiting at the spray nozzle. The optical sensor transmits a light that will reflect off of the spray if it is present. If the receiver in the sensor "sees" this reflected light, then the system knows that the spray occurred. Working with specially designed control elements, this signal should match up with a signal sent to the automatic nozzle to spray. If this signal does not match the signal from the automatic spray nozzle, then the system can alert the user of a spray error. While this type of arrangement will give verification a spray occurred, there are problems with accuracy and robustness in real world applications. During use, there can be issues with optical sensors that can cause missed sprays or false readings. If the lens of the optical sensor gets covered, say with mist or over spray that collects over time, then the sensor will not be able to either emit the light or not properly receive the signal from the reflection from the spray. This means constant maintenance to ensure the lenses are clean.

To overcome some of these drawbacks, flow meters have been used to measure actual flow rate, but having a very accurate flow meter at each nozzle can be very expensive. Also flow meters have problems keeping up with very fast response spray times in some applications, thus making nozzle sprays difficult to verify. Thus having a way of alerting when spray nozzles are failing and/or when sensors are no longer effective is desirable.

SUMMARY

In an embodiment, the disclosure provides a method for verifying spray performance of a spray device by a controller, the method comprising: (a) receiving an instruction signal for actuating a spray valve of the spray device to allow or stop a liquid flow through the spray device; (b) receiving a spray signal from a sensor of the spray device; and (c) monitoring the liquid flow through the spray device using the spray signal from the sensor and the instruction signal to determine the spray performance of the spray device.

In another embodiment, the disclosure provides a liquid spraying system comprising a spray device, configured to generate and direct a liquid spray pattern. The spray device comprises a spray valve, configured to receive an instruction signal for allowing or stopping a liquid flow through the spray device, and a sensor, configured to measure a spray signal. The liquid spraying system further comprises a controller coupled to the sensor. The controller is configured to monitor the liquid flow through the spray device using the spray signal from the sensor and the instruction signal to determine the spray performance of the spray device.

Figure 1:
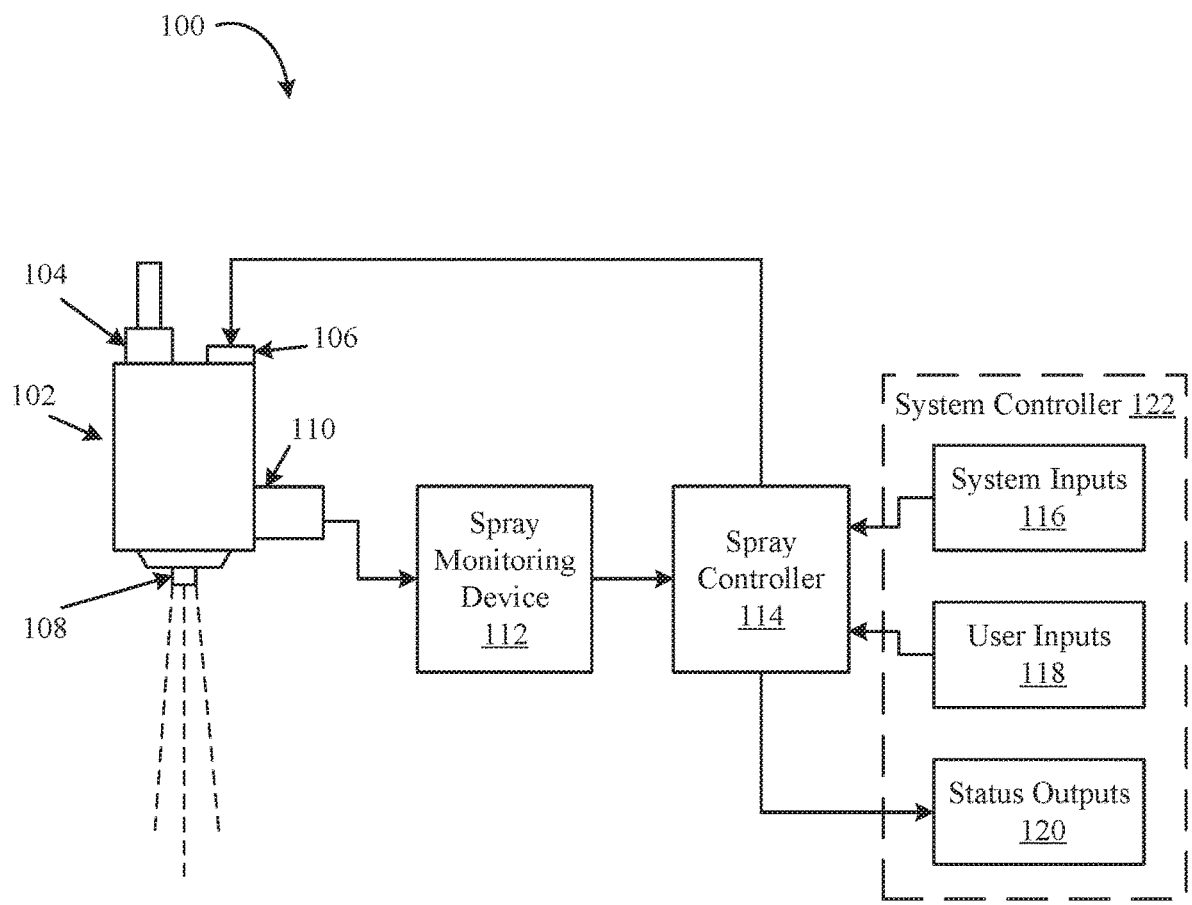
FIG. 1 illustrates a control system for monitoring flow of a spray device in accordance with the disclosure.

While the invention is susceptible of various modifications and alternative constructions, certain illustrative embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION

Embodiments of the disclosure provide a spray monitoring device that measures liquid flow from a spray nozzle through various means. The measured liquid flow can be used for monitoring an automatic spray valve performance and for verification of each individual spray event. The liquid flow can be determined by measuring pressure applied to the spray nozzle which can be measured with a sensor of sufficient sampling rate using direct or indirect (non-contact) measurements using strain gauges, piezoelectric, Hall Effect type sensors, and so on. Sensors according to embodiments of the disclosure can provide very rapid response and can be completely isolated from process or spray fluid operating in the spray nozzle.

Embodiments of the disclosure further provide a spray device with a high speed electric valve utilizing Pulse Width Modulation (PWM) to control an actuating plunger for opening and closing the spray valve. In an embodiment, an added insert is placed between the plunger seal and spray nozzle. The insert has a thin wall section that deflects when exposed to internal spray pressure of the spray device. This strain (deflection) is measured using, e.g., a strain gauge bonded on the exterior of the insert, in fluid isolation from fluid present within the device. Thus the strain gauge is maintained in fluid isolation from the spray or process fluid.

Embodiments of the disclosure provide an actuating spray valve with an integrated sensor for measuring characteristic instruction and spray signals. Also provided is a spray monitoring device that uses system, user and performance inputs to verify that the actuating spray valve is functioning correctly. The embodiments also provide a method of communicating with various controllers and/or factory operation systems connected to a spray system including the actuating spray valve.

Embodiments of the disclosure provide verification of spray performance using direct or indirect measurement of an instruction signal of an actuating spray valve at each open and close event. Spray pressure can be checked at a given time delay to validate a match in a state of the actuating spray valve. The spray valve can be in an open state or in a closed state which correspond to a higher pressure reading in an open state than in a closed state.

Embodiments of the disclosure provide verification of spray performance by continuously monitoring an instruction signal of an actuating spray valve and a spray pressure signal of the actuating spray valve to monitor timing markers for every spray cycle. By monitoring timing markers, the actuating spray valve can be determined to be in working order or to be faulty. Continuous monitoring or event-based monitoring allows tracking timing characteristics of an actuating spray valve through a lifespan of the spray valve.

Referring more particularly to FIG. 1 of the drawings, there is shown an illustrative control system 100 for monitoring flow of a spray nozzle or spray device 102. The spray device 102 includes a sensing element or sensor (not shown) in a sensing circuitry 110 for providing to a spray monitoring device 112 readings pertaining to flow operation of the spray device 102. The spray device 102 provides a spray pattern from spray tip 108 when the spray device 102 is configured to deposit spray fluid. The spray device 102 includes an electrical interface 106 to receive command inputs from a spray controller 114 that determines when the spray device 102 should deposit spray fluid and when the spray device 102 should not deposit spray fluid. The spray device 102 includes a fluid connector 104 to hold a tubing that sources fluid to be deposited by the spray device 102.

The spray device 102 includes a sensing circuitry 110 disposed to measure a parameter that is indicative of whether a spray has occurred or is occurring and provides this information to a spray monitoring device 112. The spray monitoring device 112 includes electronic components to interface the spray device 102 with the spray controller 114. The sensing circuitry 110 includes a sensing element or sensor and signal conditioning circuits. The signal conditioning circuits interpret signals coming from the sensor to electrical voltage or electrical current levels that the spray monitoring device 112 can work with. The spray monitoring device 112 may then process the electrical voltage or electrical current signals received from the sensing circuitry so that the spray controller 114 can use these signals to determine electrical command inputs suitable for the spray device 102 at the electrical interface 106. In some embodiments, serial data transmission is used for providing output of the sensing circuitry 110 to the spray monitoring device 112. Wireless data transmission can be used as well. Although shown separately, in some embodiments, the sensing circuitry 110 and the spray monitoring device 112 are implemented as a single component.

In some embodiments, in addition to adjusting command inputs to the electrical interface 106, the spray controller 114 may also receive inputs from a remote system (system inputs 116) or from an operator or a user (user inputs 118). System inputs 116 may be inputs from a remote server controlling multiple spray devices with a configuration file, while user inputs 118 may be inputs from a keyboard, a button, a touchscreen and the like. The spray controller 114 may be realized as a microcontroller, a microprocessor, a field programmable gate array (FPGA), a computing device, for example, a laptop computer, a desktop computer, a smartphone, etc. Using user inputs 118 and system inputs 116, an operator may instruct spray controller 114 to provide specific command inputs to the electrical interface 106. Furthermore, the spray controller 114 may provide status outputs 120 through human machine interfaces (HMIs) which include computer monitors, television screens, and so on. In some embodiments, the status outputs 120 are provided as light indicators, e.g., using light emitting diodes (LEDs) or bulbs.

Figure 2A:
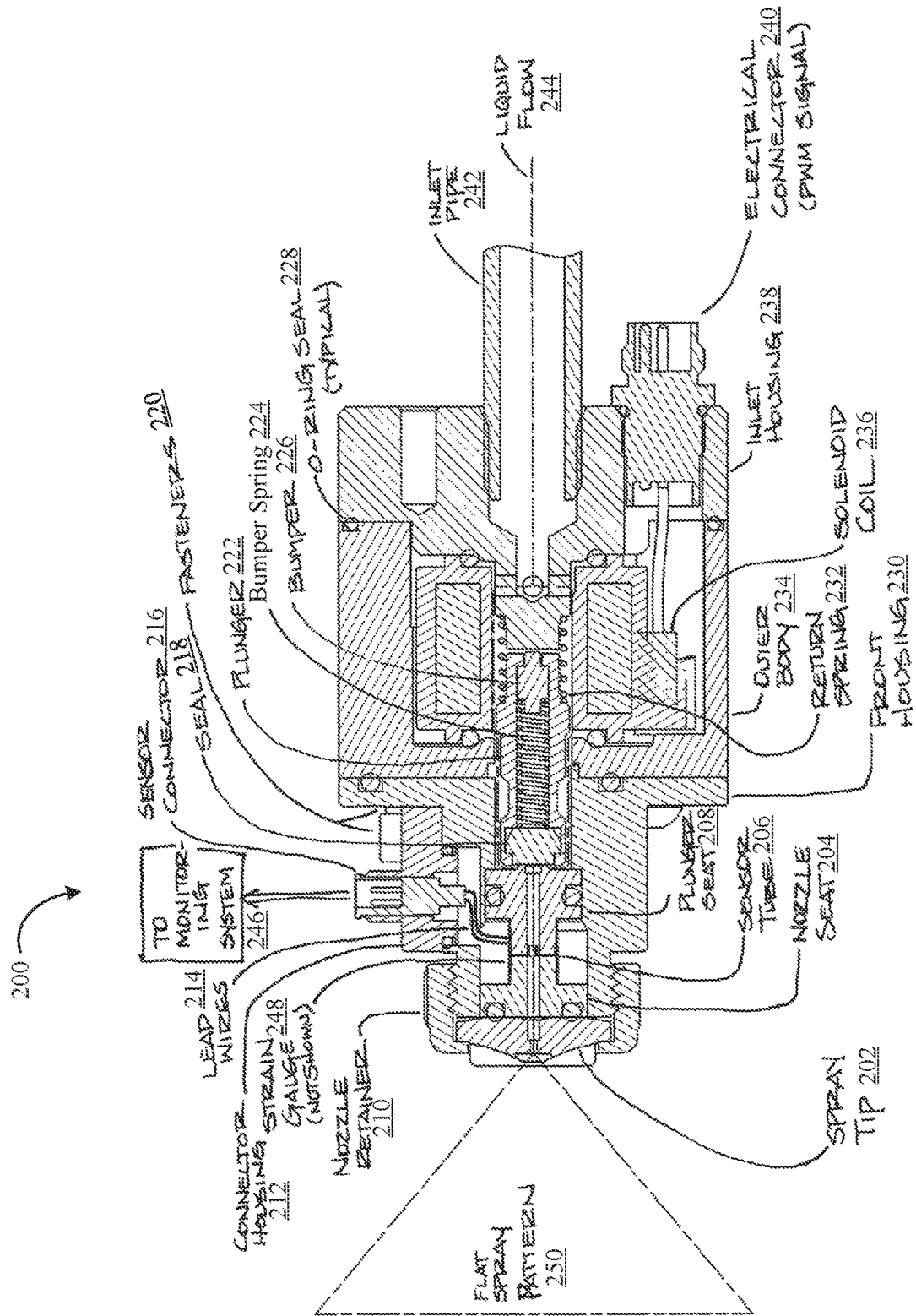
FIG. 2A illustrates an embodiment of a spray device with a sensing element that may be used in the control system shown in FIG. 1 in accordance with the disclosure.

FIG. 2A illustrates an embodiment of a spray device 200 with a sensor (for example, strain gauge) that may be used in the control system shown in FIG. 1. The spray device 200 includes an inlet housing 238, an outer body 234, and a front housing 230. A solenoid coil 236 is contained within the inlet housing 238, and a nozzle retainer 210 engages and holds a spray tip 202 in place. A valve plunger 222 is mounted for controlled reciprocating movement in response to operation for the solenoid coil 236 for controlling the spray liquid discharge from the spray tip 202. The spray device 200 includes an inlet pipe 242 for receiving process liquid with process liquid flowing from one end of the inlet pipe 242 towards the spray tip 202 end of the spray device 200.

To enable connection of the solenoid coil 236 to a remote electrical source, the spray device 200 is provisioned with an electrical connector 240 for receiving, for example, a PWM signal. Additionally, the spray device 200 is provisioned with an electrical connector (sensor connector 216) for connecting a spray sensor (strain gauge 248) to a monitoring system 246. Lead wires 214 interface the spray sensor (not shown) to the sensor connector 216. The sensor connector 216 is disposed in a connector housing 212. The strain gauge 248 or spray sensor is disposed on a sensor tube 206 situated between a nozzle seat 204 and a plunger seat 208.

The sensor tube 206 bends and deflects in response to spray fluid entering a region in a cylindrical chamber between the seal 218 and the spray tip 202. The flow of spray liquid through the region is controlled by a valve plunger 222. A bumper spring 224 is disposed in a section of the valve plunger 222. The magnetic field created by the solenoid coil 236 will cause a force along the axis of the solenoid actuator to pull closed the gap between the fixed and movable armatures. In this case of FIG. 2A, the valve plunger 222 is drawn back toward the stem portion of the stationary inlet housing 238. The valve plunger 222 is at an open position when it is drawn towards the fixed armature. The bumper 226 and the bumper spring 224 help to absorb the impact of the plunger 222 upon the fixed armature. When the valve plunger 222 is moved to the open position, liquid is directed through an opening that leads to the spray tip 202. A return spring 232 provides the force that returns the plunger 222 to a closed position as shown in FIG. 2A. In the closed position, the seal 218 prevents liquid from flowing through the opening that leads to the spray tip 202.

Figure 2B:
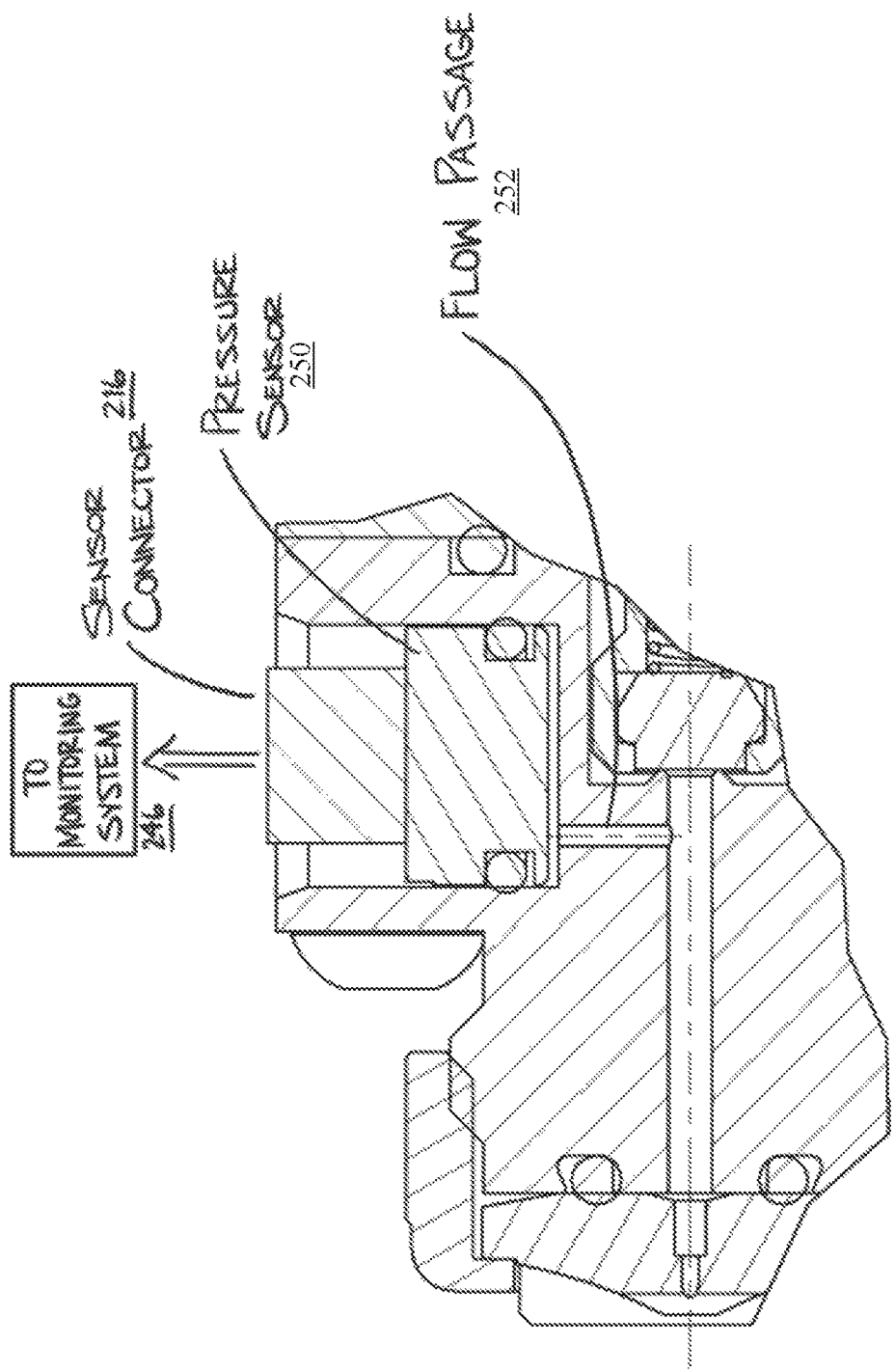
FIG. 2B illustrates an embodiment of a spray device with a different sensing element that may be used in the control system shown in FIG. 1 in accordance with the disclosure.

FIG. 2B illustrates a modification of the spray device of FIG. 2A for an original equipment manufacturer (OEM) sensor according to an embodiment of the disclosure. The OEM sensor is a pressure sensor 250 that interfaces with a flow passage 252. Readings from the pressure sensor 250 are provided to the monitoring system 240 via a sensor connector 216. The OEM sensor or pressure sensor 250 may include a sensing diaphragm that expands and contracts in response to pressure levels in the flow passage 252. The pressure sensor 250 converts the expansion or contraction of the sensing diaphragm to electrical signals which are provided to signal conditioning circuits (not shown) via the sensor connector 216 en route to monitoring system 246.

Figure 3:
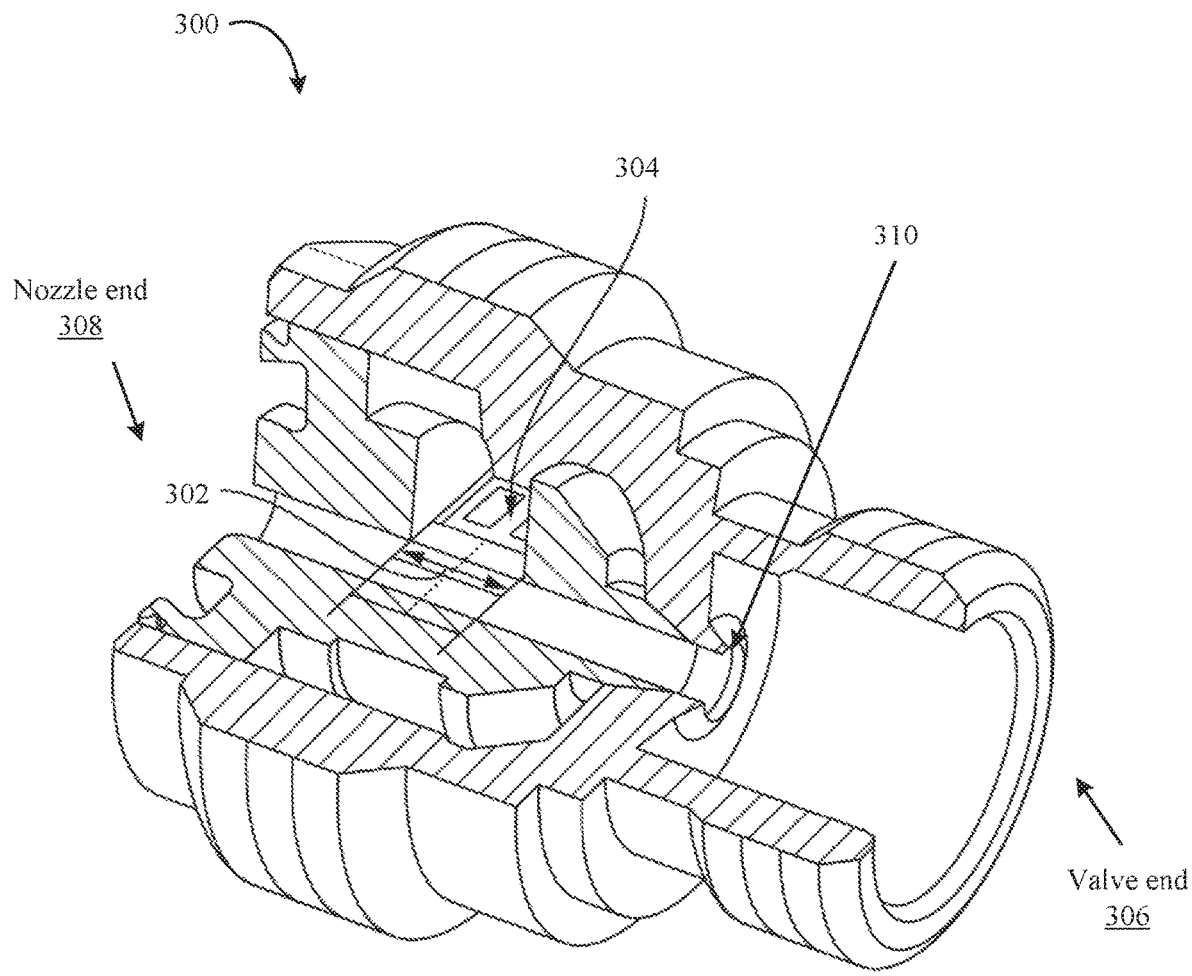
FIG. 3 illustrates a partial section view of a spray device having a thin-walled section for mounting an internal spray pressure sensor.

FIG. 3 illustrates a perspective view inside a portion 300 of an embodiment of a spray device, showing a thin-walled section 302 for mounting of a sensing element 304. The portion 300 of the spray device is analogous to a similar portion between nozzle seat 204 and seal 218 of the spray device 200 of FIG. 2A. The portion 300 has a valve end 306 and a nozzle end 308. The valve end 306 is an end where a plunger or needle may seal the opening 310 to prevent fluid from flowing into the chamber with the thin-walled section 302. The nozzle end 308 is an end where a spray tip may be attached to achieve a spray pattern, for example, spray pattern 250. During operation of a spray device according to this embodiment of the disclosure, when the opening 310 is sealed or closed, the chamber containing the thin-walled section 302 is at one pressure extreme, and when the opening 310 is not sealed or opened, the chamber containing the thin-walled section 302 is at another pressure extreme. During operation of the spray device where the opening 310 is being sealed and unsealed, the pressure level transients between these two extremes.

As a pressure of fluid in contact with the thin-walled section 302 changes in the chamber containing the thin-walled section 302, the thin-walled section deflects, bends, or bows. For example, when the opening 310 is sealed, the thin-walled section 302 experiences low pressure and is at a resting or manufactured state. In this condition, a fluid pressure acting on the thin-walled section is the static pressure of fluid within the chamber. When the opening 310 is unsealed, the pressure in the chamber containing the thin-walled section 302 increases causing the thin-walled section to deflect. The increase in pressure may be due to exposure of the thin-walled section to operating pressure of fluid that will be deposited from the nozzle. The amount of deflection is proportional to the increase in pressure. In some embodiments, thin-walled section 302 may be made out of polymer plastics or metal, for example, stainless steel. In some embodiments, the thin-walled section 302 is less than 0.25 mm (0.010 in) thick.

The sensing element 304 is configured to provide a signal indicative of an internal spray pressure in the chamber. In an embodiment, the sensing element 304 is physically bonded to the thin-walled section 302 of the portion 300 of the spray device. As the thin-walled section 302 bends due to change in pressure, the sensing element 304 bonded on the thin-walled section 302 also bends. In an embodiment, the sensing element is a strain gauge and the change in shape of the strain gauge changes the electrical resistance of the strain gauge. Thus, by providing power to the strain gauge a spray monitoring device, for example, spray monitoring device 112, can sense the change in resistance and ultimately change in pressure in the chamber containing the thin-walled section 302. An increase in pressure may interpreted as the beginning of a spray event, that is, spray fluid entering the chamber and eventually released through a spray tip. A decrease in pressure may be interpreted as the ending of a spray event, that is, more spray fluid being prevented from entering the chamber. A constant pressure may be interpreted as either a spray event is occurring or a spray event is not occurring. The level or magnitude of the pressure during a spray event will be higher than the level or magnitude of the pressure when a spray event is not occurring. These pressure readings are readily obtainable through the deflection in the thin-walled section 302 being translated to a resistance change in the strain gauge. The strain gauge is used as an example, but the sensing element 304 can be an OEM sensor as provided in the FIG. 2B embodiment where a flow passage 252 is provided to the pressure sensor 250. The pressure sensor 250 can include a sensing diaphragm that expands in response to an increase in pressure.

Figure 4A:
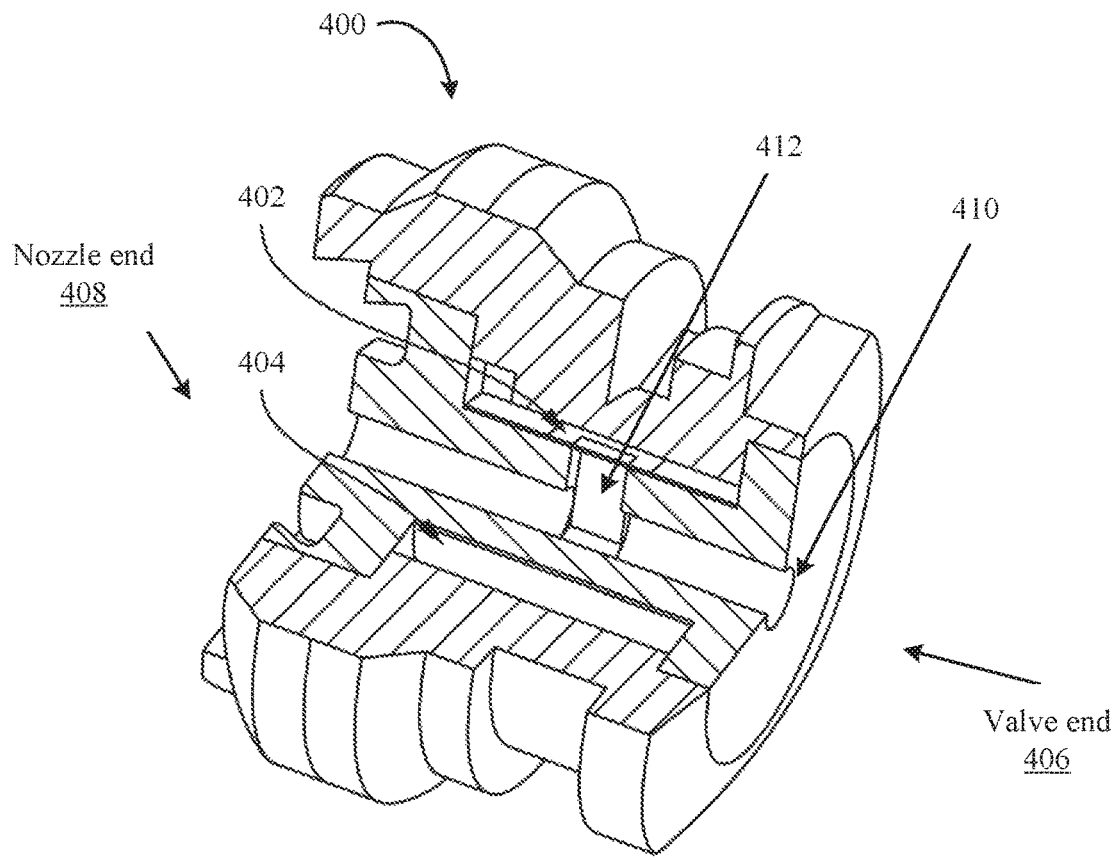
FIG. 4A illustrates a section view of a second embodiment of a spray device showing a thin-walled tube element for mounting of an internal spray pressure sensor in accordance with the disclosure.
Figure 4B:
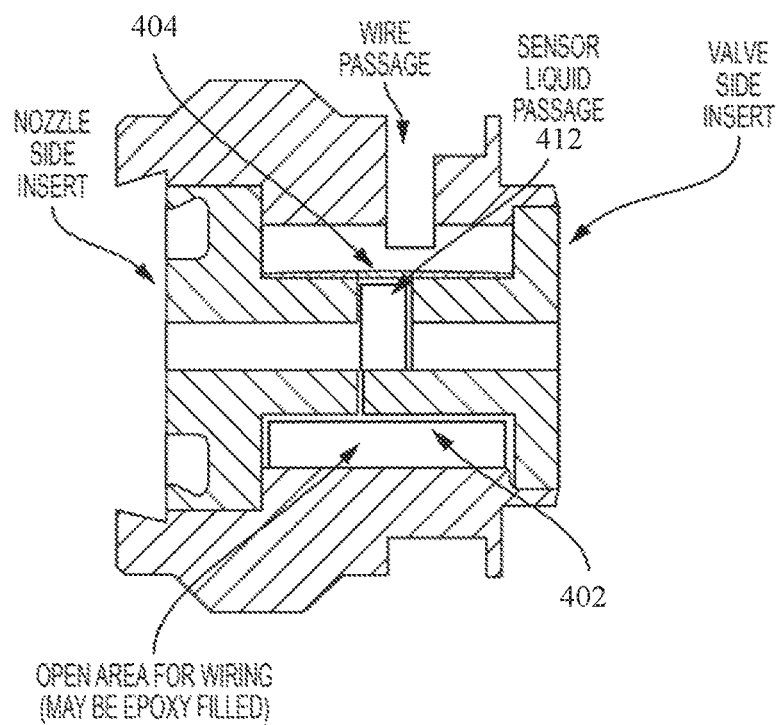
FIG. 4B illustrates a cross section of the perspective view shown in FIG. 4A.

FIG. 4A illustrates a perspective view inside a portion 400 of a second embodiment of a spray device, showing a thin-walled tube element 404 for mounting of a sensing element 402. The sensing element 402 serves as a way to extract a measurement of an internal spray pressure of the spray device. The description is similar to that provided in FIG. 3. The portion 400 has a valve end 406 and a nozzle end 408. The valve end 406 is an end where a plunger or needle may seal the opening 410 to prevent fluid from flowing into the chamber with the thin-walled tube element 404. A difference between the portion 300 and the portion 400 is in portion 400, the device bending in response to pressure is a thin-walled tube element while that in portion 300 is not tubular in nature. Additionally, the sensor in portion 300 sits tangential as shown in the placement of the sensing element 304 while the sensing element 402 wraps around the thin-walled tube element 404 in portion 400. FIG. 4B illustrates a cross section of the perspective view shown in FIG. 4A. In FIG. 4B, it is shown that a sensor liquid passage may be provided to increase sensitivity to pressure by allowing spray liquid direct contact with the thin-walled tube element 402. Further detail on construction of both types of sensing mechanisms (thin-walled tube element and thin-walled section) will be provided.

Figure 5A:
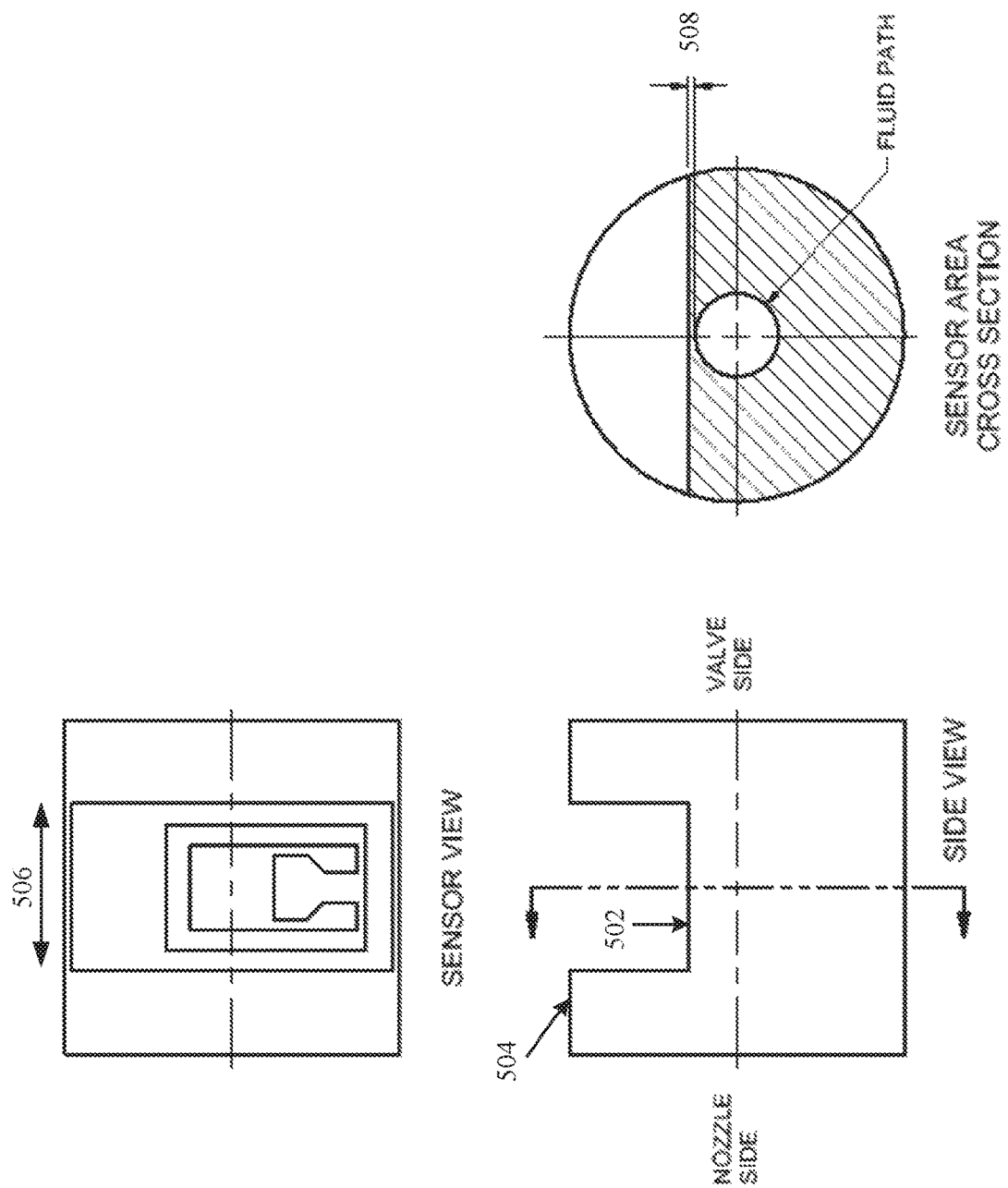
FIG. 5A illustrates cross section views of a tangent thin-walled section with a sensor according to an embodiment of the disclosure.

FIG. 5A illustrates cross section views of a tangent thin-walled section with a sensor according to an embodiment of the disclosure. These cross section views will be described with the aid of FIG. 3 when necessary. As shown in FIG. 3, there is a cylindrical path for spray fluid flow through the chamber containing the thin-walled section. FIG. 3 provided a cut-out to allow a view inside this cylindrical path. The cross section views of FIG. 5A do not have this cutout, so when looking down at where sensing element 304 is placed, the view will resemble the sensor view. When looking from the side containing the thin-walled section, the view will resemble the side view, and when looking along the spray fluid path, the view will resemble the sensor area cross section view.

The sensor view shows where the sensing element is placed. The side view shows that the area 502 where the sensor is placed is lower than other areas, for example area 504. The sensor area cross section shows that in relation to the cylindrical path of the spray fluid, the sensor sits close to the spray fluid. The distance 508 between the sensor and the spray fluid is the thickness of the thin wall in the thin-walled section 506.

Figure 5B:
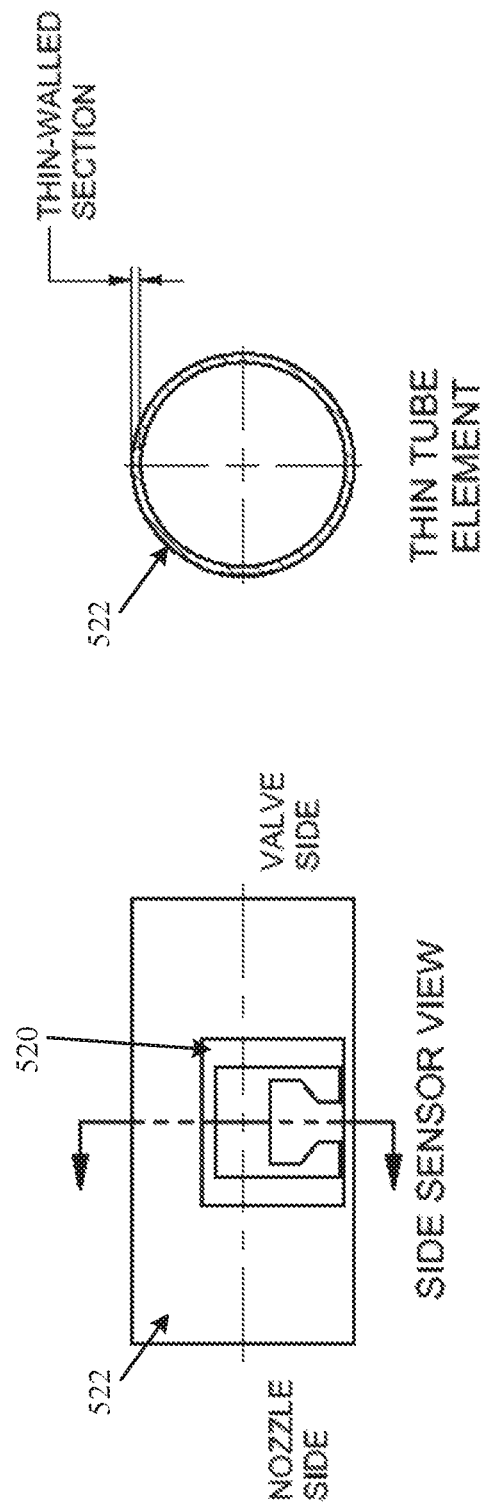
FIG. 5B illustrates cross section views of a thin-walled tube element with a sensor according to an embodiment of the disclosure.

FIG. 5B illustrates cross section views of a thin-walled tube element with a sensor according to an embodiment of the disclosure. The cross section views will be described with the aid of FIGS. 4A-B when necessary. As shown in FIG. 4A, a thin-walled tube element bridges the valve end 406 and the nozzle and 408. There is provided an opening designated as the sensor liquid passage 412. In FIG. 3, spray fluid followed a cylindrical path, but in FIG. 4A, as shown, there is a change in diameter where the sensing element 402 is situated on the thin-walled tube element 404, and only part of the thin-walled tube element 404 is exposed to spray fluid.

FIG. 5B provides a different embodiment of the thin-walled section containing the thin-walled tube element. The thin-walled section where the sensor sits is shown to have a path where spray fluid would be in contact with the entire inner surface of the thin-walled tube element. The sensing element 520 is bonded to the surface of the thin-walled tube element 522, and in the section where the sensing element 520 is bonded, the inner surface of the thin-walled tube element 522 comes in contact with the spray fluid when fluid flows through the spray device.

Figure 6:
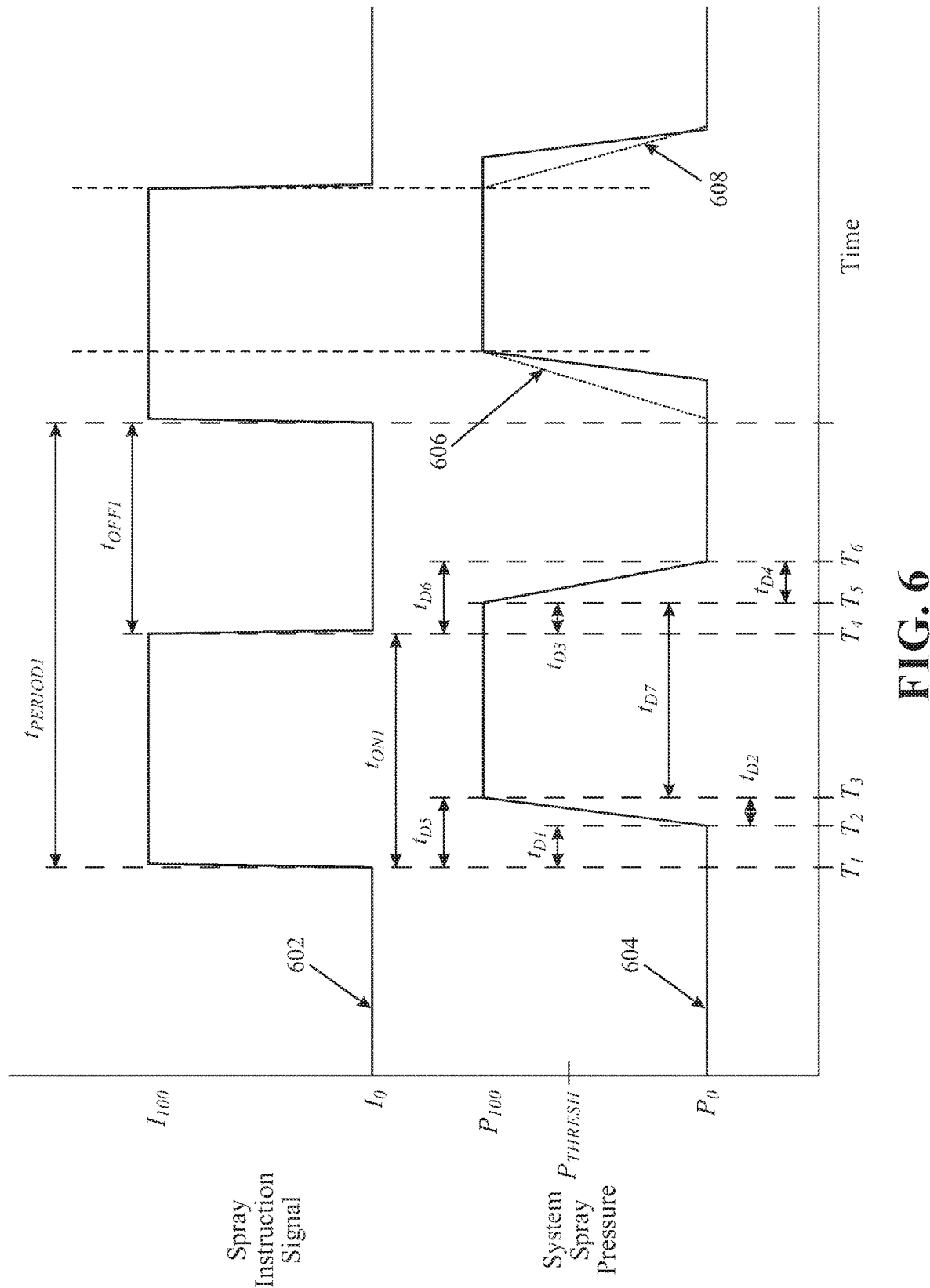
FIG. 6 illustrates exemplary waveforms showing a relationship between a spray instruction signal and a spray pressure in a spray device.

FIG. 6 illustrates exemplary waveforms showing a relationship between a spray instruction signal 602 and a spray pressure 604 in a spray device. The spray instruction signal 602 may be a command input provided by the spray controller 114 to the electrical interface 106 of the spray device 102. When the spray instruction signal 602 indicates a close valve instruction $I_0$, the spray device 102 is being put in an OFF state so spray fluid should not be flowing out of spray tip 108. When the spray instruction signal 602 indicates an open valve instruction $I_{100}$, then the spray device 102 is being put in an ON state so spray fluid should eventually flow out of spray tip 108. When the spray device 102 is in an ON state, a spray valve (e.g., plunger/needle of FIG. 2A) of the spray device 102 is in an open state, and when the spray device 102 is in an OFF state, the spray valve of the spray device 102 is in a closed state. Transition of the spray valve from a closed state to an open state is an open event, and transition from an open state to a closed state is a close event. A passive spray valve in a closed state blocks or obstructs a path for liquid flow through a spray device, stopping the liquid flow through the spray device. A passive spray valve in an open state allows liquid flow through the spray device.

In a PWM controlled spray device such as a solenoid controlled device, a period $t_{PERIOD1}$ can be defined where the spray device 102 is commanded to be ON for a duration of taw and OFF for a duration of $t_{OFF1}$. In FIG. 6, timestamps are provided as examples in relation to a PWM controlled spray device where $T_1$ designates when spray instruction signal 602 switches from $I_0$ to $I_{100}$, and $T_4$ designates when spray instruction signal 602 switches from $I_{100}$ back to $I_0$.

In response to commanding the spray device 102 to be ON for a duration $t_{ON1}$ and OFF for a duration $t_{OFF1}$, the pressure inside the spray device 102 changes. System spray pressure 604 is one embodiment of how the pressure inside the spray device 102 may change. In response to the spray instruction signal 602 switching at time $T_1$, the system spray pressure 604 changes from an initial pressure of $P_0$ to a final pressure of $P_{100}$. As shown in FIG. 6, there is a delay from when the spray instruction signal 602 switches at time $T_1$ to when the system spray pressure 604 begins to rise at time $T_2$. The system spray pressure 604 takes a duration of $t_{D2}$ to rise from $P_0$ to $P_{100}$ at time $T_3$.

A similar dynamic occurs when the spray instruction signal 602 switches at time $T_4$ from $I_{100}$ to $I_0$. A delay $t_{D3}$ is observed before system spray pressure 604 begins to fall at time $T_5$ from $P_{100}$ to $P_0$ at time $T_6$. A duration $t_{D4}$ is how long it takes for the pressure to fall to $P_0$. Thus, a definition can be made between the different timestamps and durations identified in FIG. 6. $t_{D5}$ is the sum of $t_{D1}$ and $t_{D2}$, $t_{D6}$ is the sum of $t_{D3}$ and $t_{D4}$, and $t_{D7}$ is how long the system spray pressure 604 remains at $P_{100}$. $t_{D5}$ is the duration of an open event, and $t_{D6}$ is the duration of a close event. Intuitive interpretations for these identified times and durations in the context of the spray device 102 will be provided.

The parameter $t_{ON1}$ as described is a command duration designated by the spray instruction signal 602 for the spray device 102 to be ON (duration for the spray valve to remain open). $t_{D1}$ is an ON delay for the spray valve (e.g., plunger/needle in FIG. 2A) to begin opening in response to the spray instruction signal 602. $t_{D2}$ is a spray formation delay where a spray pattern of the spray device 102 goes from no fluid flow to a maximum fluid flow for a designed spray tip 108. $t_{OFF1}$ as described is a command duration designated by the spray instruction signal 602 for the spray device 102 to be OFF (duration for the spray valve to remain closed). $t_{D3}$ is an OFF delay for the spray valve to begin closing in response to the spray instruction signal 602. $t_{D4}$ is a spray collapse delay where a spray pattern of the spray device 102 goes from a maximum fluid flow to little or no fluid flow for the designed spray tip 108. From a macro measurement level, in an open event, $t_{D5}$ may be defined as a spray ON delay, and in a close event, $t_{D6}$ may be defined as a spray OFF delay. The spray ON delay is the time it takes for the spray device 102 to reach maximum flow rate after a command input has been provided that the spray device 102 be turned ON. The spray OFF delay is the time it takes for the spray device 102 to reach a minimum flow rate after a command input has been provided that the spray device 102 be turned OFF. Using the spray ON delay $t_{D5}$ and the spray OFF delay $t_{D6}$, an ON slope 606 and an OFF slope 608, respectively, can be defined. ON slope 606 can be mathematically written as $(P_{100}-P_0)/t_{D5}$, and OFF slope 608 can be mathematically written as $(P_0-P_{100})/t_{D6}$.

Using these time durations and definitions, several monitoring strategies may be implemented: (1) positive spray pulse verification, (2) valve performance monitoring, and (3) closed-loop control for spray application rate. In positive spray pulse verification, the spray monitoring device 112 provides to the spray controller 114 pressure readings from the spray device 102. The spray controller 114 monitors the pressure readings as the pressure increases from a level $P_0$ to a threshold pressure level $P_{THRESH}$ which is less than or equal to the maximum system spray pressure $P_{100}$. In some embodiments, in addition to monitoring whether the system spray pressure reaches a threshold, the ON delay $t_{D5}$ may be monitored to verify that the ON delay $t_{D5}$ is less than the command ON time $t_{ON1}$. Under positive spray pulse verification, whenever $P_{THRESH}$ is not met or whenever the ON delay $t_{D5}$ is greater than the command ON time tom, the spray controller 114 may provide an error alarm or adjust parameters to influence overall system controls.

In valve performance monitoring, the performance of a valve separating a chamber with a thin-walled section (for example, as shown in several embodiments of the disclosure in FIGS. 3-5) is evaluated. The spray controller 114 tracks and logs spray events from the spray device 102 and determines trends and deviation over the life cycle of the spray device 102 compared to a baseline performance. For example, over multiple spray ON and spray OFF events, the spray ON delay $t_{D5}$ may change indicating that the valve may be wearing down or a mechanism to control a plunger/needle to begin opening may be wearing down. Over multiple spray ON and spray OFF events, the spray OFF delay may change indicating that the spray device 102 may be wearing down or that there is a blockage in the spray device 102. Additionally, ON slope 606 and OFF slope 608 may be monitored to determine if the spray device 102 is experiencing a blockage or is wearing down. Thus, in valve performance monitoring, open event timings and close event timings can be monitored and logged over the life of the valve for notification by the spray controller 114 when the valve deviates to a point indicating a service needs to be performed. This helps an organization plan for and define service intervals especially when the monitored data indicates that a failure is imminent. In addition to informing of service intervals, by comparing the change in the minimum system spray pressure $P_0$, the temperature of the valve can be monitored.

In closed-loop control for spray application rate, the flow rate of applying a spray fluid can be determined using a combination of various factors. These factors include: (1) a flow rate based upon the value of $P_{100}$ and a specified spray tip 108; (2) the effective spray time $t_{D7}$ in relation to the command ON time $t_{ON1}$; (3) desired spray volume or process application rate based on application spray parameters such as spray height, width, and line speed; (4) desired application rate from spray controller 114 versus calculated application rate based on spray sensor output and calculations which may be used to adjust command ON time for each spray valve in the control system 100.

Figure 7:
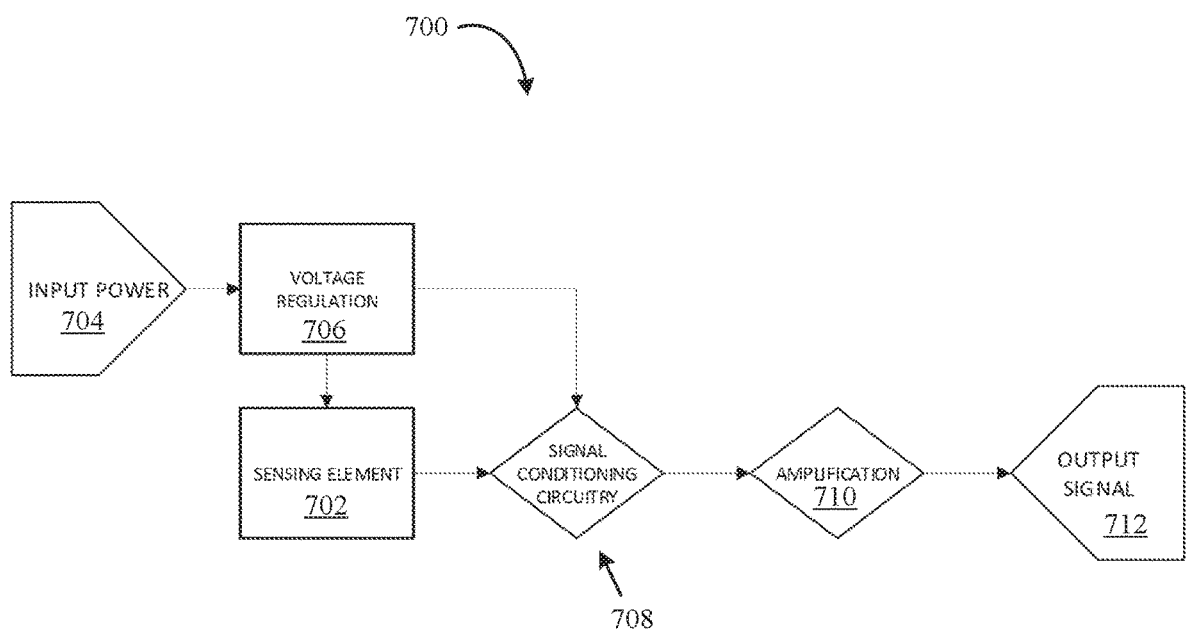
FIG. 7 illustrates a schematic of a sensing circuitry according to an embodiment of the disclosure.

FIG. 7 illustrates a schematic of a sensing circuitry 700 according to an embodiment of the disclosure. The sensing circuitry 700 includes a sensing element 702 for measuring pressure or instruction signal in a spray device according to various embodiments of the disclosure. The sensing circuitry 700 receives an input power 704 and voltage regulation 706 circuit regulates the input power for interfacing with the sensing element 702 and signal conditioning circuitry 708. The signal conditioning circuitry 708 receives pressure measurements from the sensing elements and conditions the pressure measurements to acceptable electrical voltage or electrical current levels for amplification 710 circuits. After amplification 710, the output signal 712 is provided to the spray monitoring device which performs calculations to determine open and close events as defined using the time durations in FIG. 6.

In FIG. 7, the output signal 712 can be monitored by a spray monitoring device and utilized to provide diagnostic information about the operation of a spray device. Diagnostic information may include: (1) If the spray device was actuated and fluid successfully exited the spray tip; (2) What the applied pressure at the spray tip; (3) Whether the spray tip is clogged or damaged; (4) Wear and tear information about the spray device. As described for FIG. 1, analog voltage signal detected by the sensing circuitry 110 will be processed by the spray controller 114 and compared to previous readings and configuration data to analyze and diagnose operating conditions for the spray device 102.

Figure 8A:
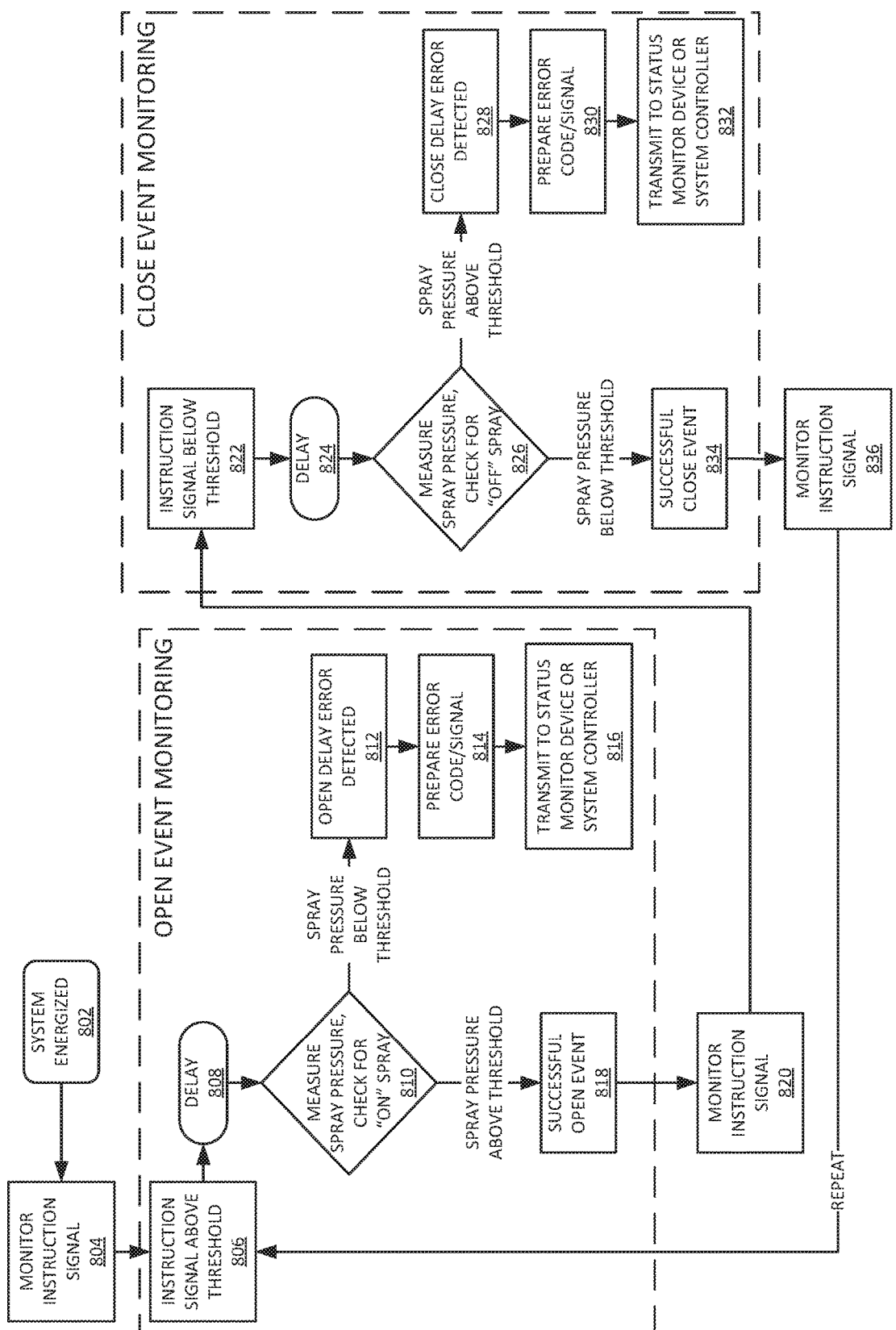
FIG. 8A illustrates an example flow diagram showing event based monitoring of a spray device according to an embodiment of the disclosure.

FIG. 8A illustrates an example flow diagram showing event based monitoring of a spray device, e.g., the spray device 102 in FIG. 1, according to an embodiment of the disclosure. At step 802, the spray controller 114 and electronic components in FIG. 1 are powered ON. At step 804, the spray controller 114 monitors an instruction signal. In an embodiment, the spray controller 114 monitors system inputs 116 or user inputs 118 for the instruction signal. In an embodiment, the spray controller 114 receives fluid pressure applied to pneumatic or hydraulic valve. In an embodiment, the spray controller 114 receives electric signals applied to a solenoid or motor valve. In an embodiment, the spray controller 114 determines provision of the instruction signal by indirectly measuring a magnetic field created by a solenoid coil of the spray device 102.

At step 806, the spray controller 114 determines that the instruction signal obtained at step 804 is above an instruction threshold. After a delay 808, the spray controller 114, at step 810, checks for an "ON" spray event by measuring spray pressure via the spray monitoring device 112.

If the spray pressure is below an open pressure threshold, then at step 812, the spray controller 114 determines that an open delay error is detected. At step 814, the spray controller 114 prepares an error/signal code, and at step 816, the spray controller 114 transmits the error code/signal to status monitor devices or system controller 122 to be displayed as status outputs 120. In an embodiment, the error code/signal generated indicates a binary state for open events. For example, the error code/signal indicates a good spray or a bad spray. Multiple bad sprays detected can cause the spray controller 114 to generate an alarm. For example, if 3 out of 100 sprays are bad sprays, an alarm can be generated as one of the status outputs 120.

If the spray pressure is above the open pressure threshold, then at step 818, the spray controller 114 determines that a successful open event has occurred. At step 820, the spray controller 114 then monitors for an instruction signal at step 820.

At step 822, the spray controller 114 determines that the instruction signal obtained at step 820 is below the instruction threshold. After a delay 824, the spray controller 114, at step 826, checks for an "OFF" spray event by measuring spray pressure via the spray monitoring device 112.

If the spray pressure is above a closed pressure threshold, then at step 828, the spray controller 114 determines that a close delay error is detected. At step 830, the spray controller 114 prepares an error/signal code, and at step 832, the spray controller 114 transmits the error code/signal to status monitor devices or system controller 122 to be displayed as status outputs 120. In an embodiment, the error code/signal generated indicates a binary state for close events. For example, the error code/signal indicates a good close or a bad close. Multiple bad closes detected can cause the spray controller 114 to generate an alarm. For example, if 3 out of 100 closes are bad closes, an alarm can be generated as one of the status outputs 120.

If the spray pressure is below the closed pressure threshold, then at step 834, the spray controller 114 determines that a successful close event has occurred. At step 836, the spray controller 114 returns to monitoring the instruction signal. The process in FIG. 8A repeats when an instruction signal is received. FIG. 8A provides an alternation between a monitoring of an open event then a monitoring of a close event. In an embodiment, the open pressure threshold and the closed pressure threshold are the same pressure threshold value, e.g., $P_{THRESH}$ of FIG. 6.

In FIG. 8A, spray pulse verification can be analyzed on an event basis. After a known time period following the spray instruction signal going to an open state, the spray pressure signal is checked for a matching open state. And after a known time period following the spray instruction signal going to a close state, the spray pressure signal is checked for a matching close state. Failed open or close events can be communicated to the system controller as errors and/or stored in memory. Successful events can be tracked over time to predict performance concerns.

Figure 8B:
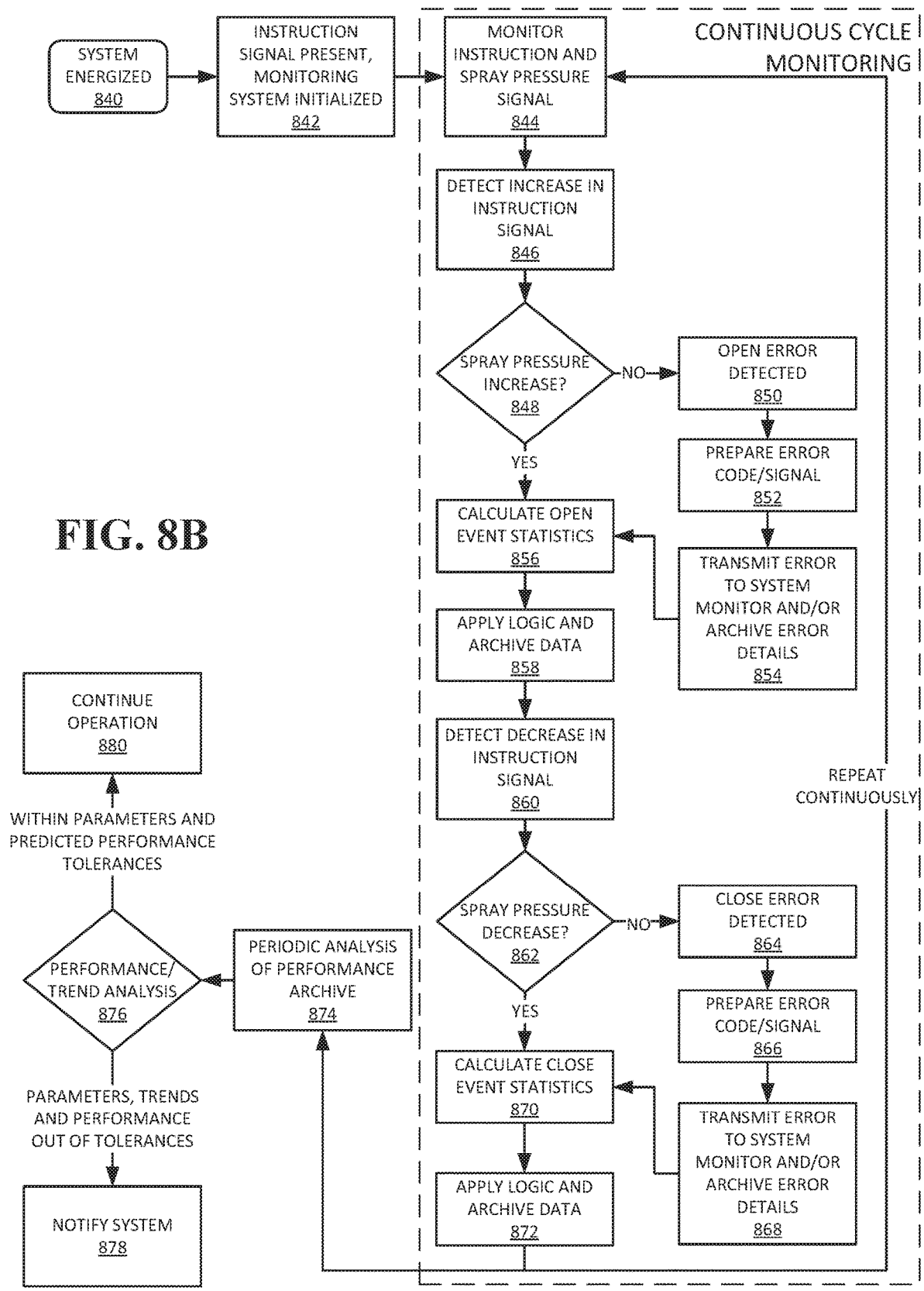
FIG. 8B illustrates an example flow diagram showing continuous monitoring of a spray device according to an embodiment of the disclosure.

FIG. 8B illustrates an example flow diagram showing continuous monitoring of a spray device, e.g., the spray device 102, according to an embodiment of the disclosure. At step 840, the spray controller 114 and electronic components in FIG. 1 are powered ON. At step 842, the spray controller 114 determines that an instruction signal is present according to various embodiments of the disclosure and initiates or initializes monitoring spray events.

At step 844, the spray controller 114 monitors instruction and spray pressure signals. At step 846, the spray controller 114 determines that there is an increase in the instruction signal, and at step 848, the spray controller 114 determines whether the spray pressure signal has increased.

If the spray pressure signal has not increased, then at step 850, the spray controller 114 detects an open event error. At step 852, the spray controller 114 prepares an error code/signal and transmits the error code/signal to the system controller 122 or other monitoring devices at step 854. Details of the error can also be archived at the system controller 122, the spray controller 114, or at the spray monitoring device 112. Then the spray controller 114 moves to step 856.

If the spray pressure signal has increased at step 848, the spray controller 114 calculates open event statistics, at step 856, and applies logic and archives data associated with the open event at step 858.

At step 862, the spray controller 114 determines whether there is a decrease in the spray pressure signal. If the spray pressure signal has not decreased, then at step 864, the spray controller 114 detects a close event error. At step 866, the spray controller 114 prepares an error code/signal and transmits the error code/signal to the system controller 122 or other monitoring devices at step 868. Details of the error can also be archived at the system controller 122, the spray controller 114, or at the spray monitoring device 112. Then the spray controller 114 moves to step 870.

If the spray pressure signal has decreased at step 862, the spray controller 114 calculates close event statistics, at step 870, and applies logic and archives data associated with the close event at step 872. Afterwards, the continuous cycle monitoring repeats starting at step 844. Event statistics collected include, e.g., calculation of average open times or average close times over time. Referring to definitions in FIG. 6, event statistics include measuring multiple values for $t_{D2}$ and/or $t_{D5}$ for open events and $t_{D6}$ and/or $t_{D4}$ for close events and using historical changes in these values, performing analysis that shows some trend in how the spray device (or spray valve) operates over time. $t_{D2}$, $t_{D5}$, $t_{D6}$, and $t_{D4}$ are provided as example metrics for qualifying the spray device and other timing metrics identified in FIG. 6 can be measured as well.

In parallel, after the spray controller 114 applies logic and archives data associated with the close event at step 872, the spray controller 114 can perform periodic analysis of performance archive at step 874. Based on the trends of the performance/trend analysis 876 being within predicted tolerances, operation of the spray device 102 is continued at step 880. Based on the trends, parameters and performance parameters being out of tolerances at step 876, the system controller 122 is notified at step 878.

In FIG. 8B, spray pulse verification can be analyzed on a continuous basis. The spray instruction signal and spray pressure signal are continuously monitored. Upon an open slope of the spray instruction signal (i.e., an increase in the spray instruction signal), the spray instruction signal and the spray pressure signal are analyzed for characteristics and timing to track, verify and analyze performance of the spray valve as it opens. Upon a close slope of the spray instruction signal (i.e., a decrease in the spray instruction signal), the spray instruction and the spray pressure signals are analyzed for characteristics and timing to track, verify and analyze the performance of the valve as it closes.

The opening and closing performance characteristics are compared to allowable limits. Failures can be communicated to the system controller. The opening and closing performance characteristics can be tracked and analyzed to predict valve performance concerns. The opening and closing performance characteristics may also be used by the system controller to modify performance.

In embodiments of the disclosure, errors generated in open events and close events can indicate one or more failures. Errors can be generated in open and close events when the spray device may be working properly but the sensors for sensing the spray instruction signal and/or the spray pressure signal are faulty. Errors can be generated in open and close events when the spray device may be working properly but the communication from the sensors for sensing the spray instruction signal and/or the spray pressure signal to the spray controller is unreliable. Errors can be generated in open and close events when the spray device is not working properly, e.g., the spray valve is faulty. Generation of error codes for bad opens, bad closes, and/or deviation from trends allows for providing early alerts to potential problems that can arise when working with spray devices.

Figure 9:
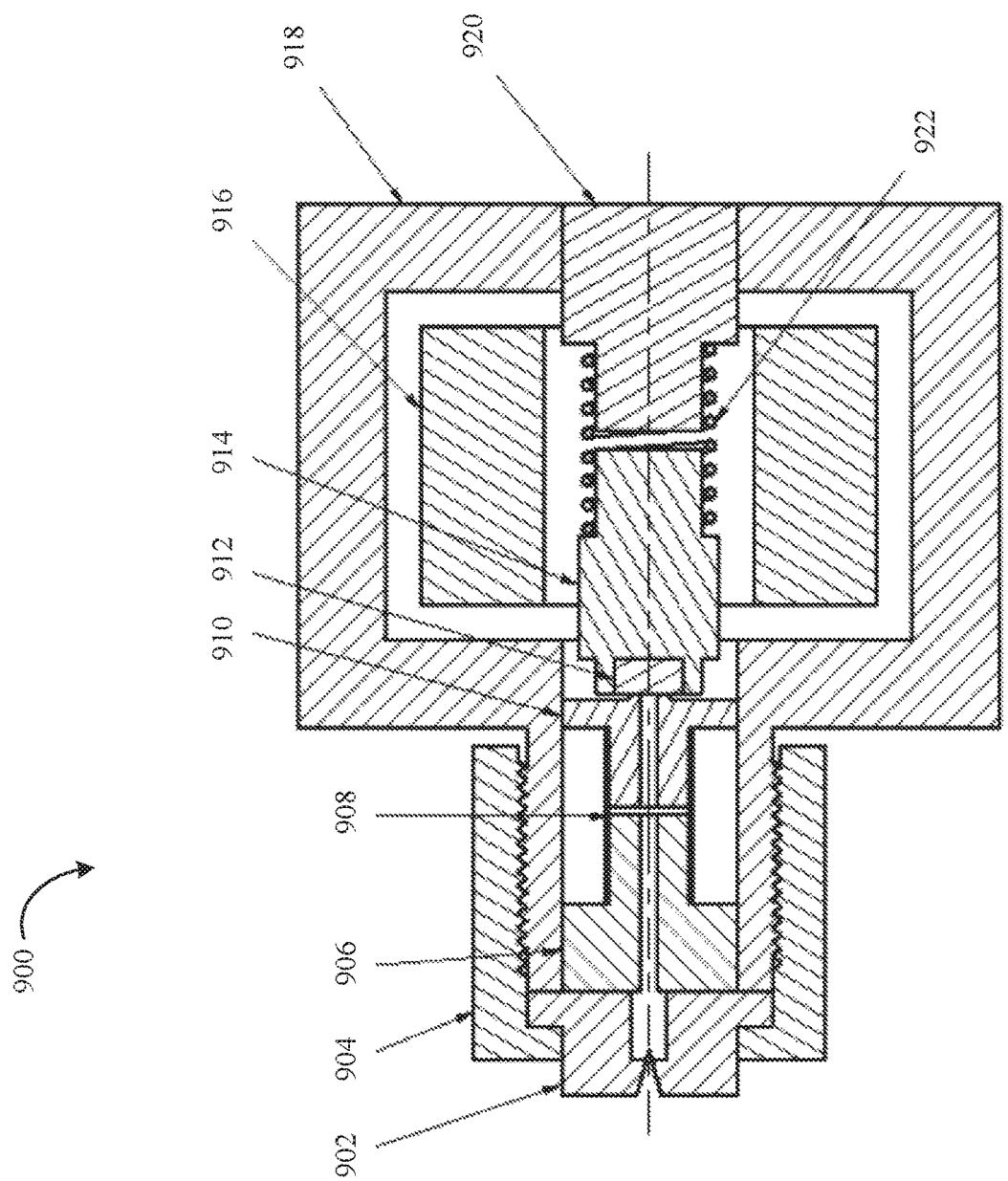
FIG. 9 illustrates a valve installation example in a solenoid actuated spray device.

FIG. 9 illustrates a valve installation example in a solenoid actuated spray device 900. The spray device 900 includes a spray tip 902, a cap 904, a nozzle insert 906, and a sensing element 908 or sensor according to an embodiment of the disclosure. The spray device 900 also includes a plunger seat 910, a plunger seal 912, a magnetic plunger 914, a copper coil 916, a magnetic body 918, a magnetic core stop 920, and a spring 922. The sensing element 908 is shown situated between the plunger seal 912 and the nozzle insert 906.

Figure 10:
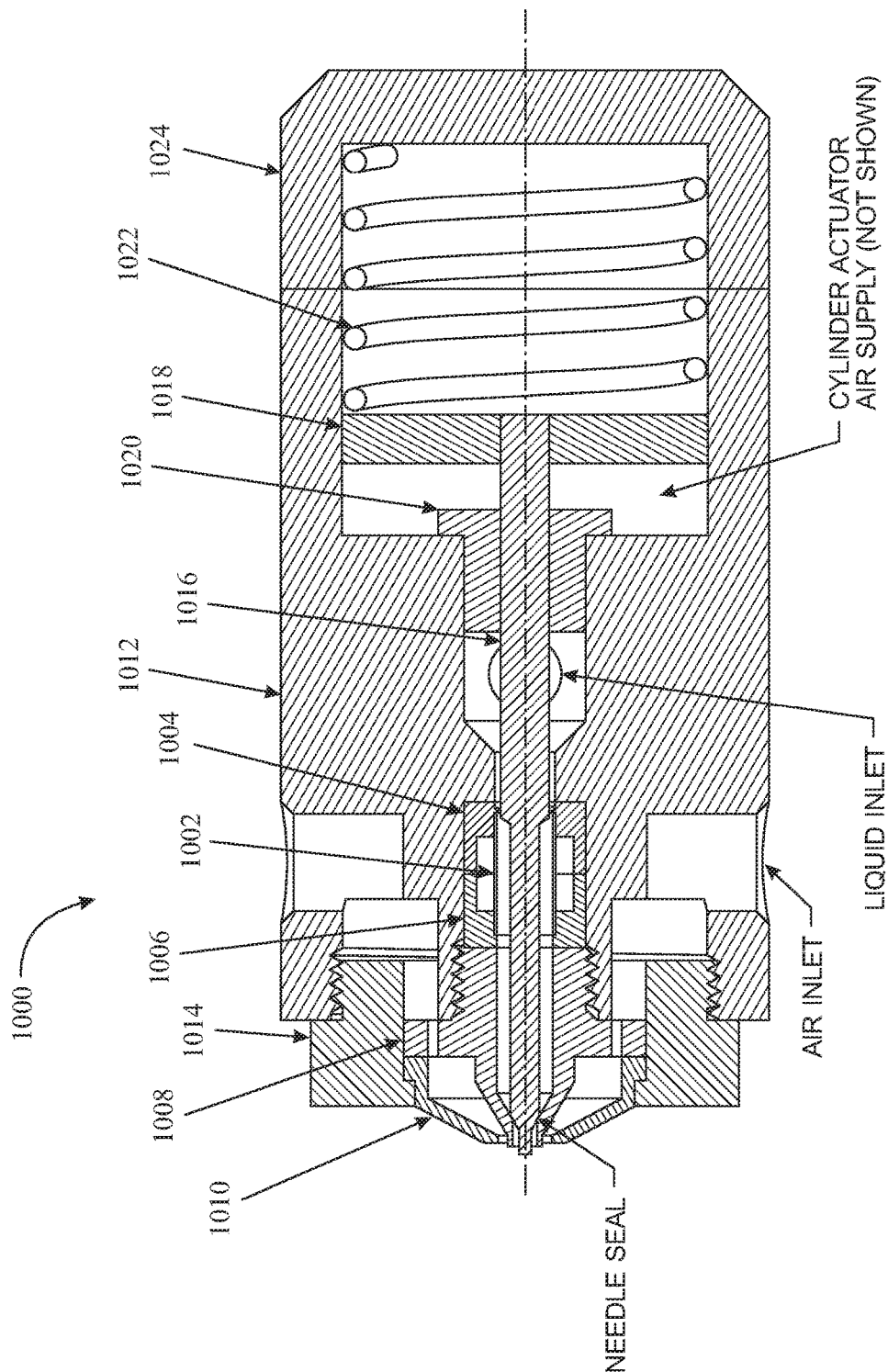
FIG. 10 illustrates a valve installation example in an air actuated spray device.

FIG. 10 illustrates a valve installation example in an air actuated spray device 1000. The spray device 1000 includes a sensing element 1002 or sensor according to an embodiment of the disclosure, a sensor housing with needle seal 1004, a sensor housing 1006, a fluid nozzle 1008 in communication with a liquid inlet, an air cap 1010 in communication with atomizing air inlet, a body 1012, a retainer cap 1014, a needle 1016, a piston 1018, a needle seal 1020 a spring 1022, and a piston cap 1024. As shown in FIG. 10, the sensing element 1002 may be installed in an air actuated spray device to determine fluid flow qualities of the air actuated spray device as described in embodiments of the disclosure.

Figure 11:
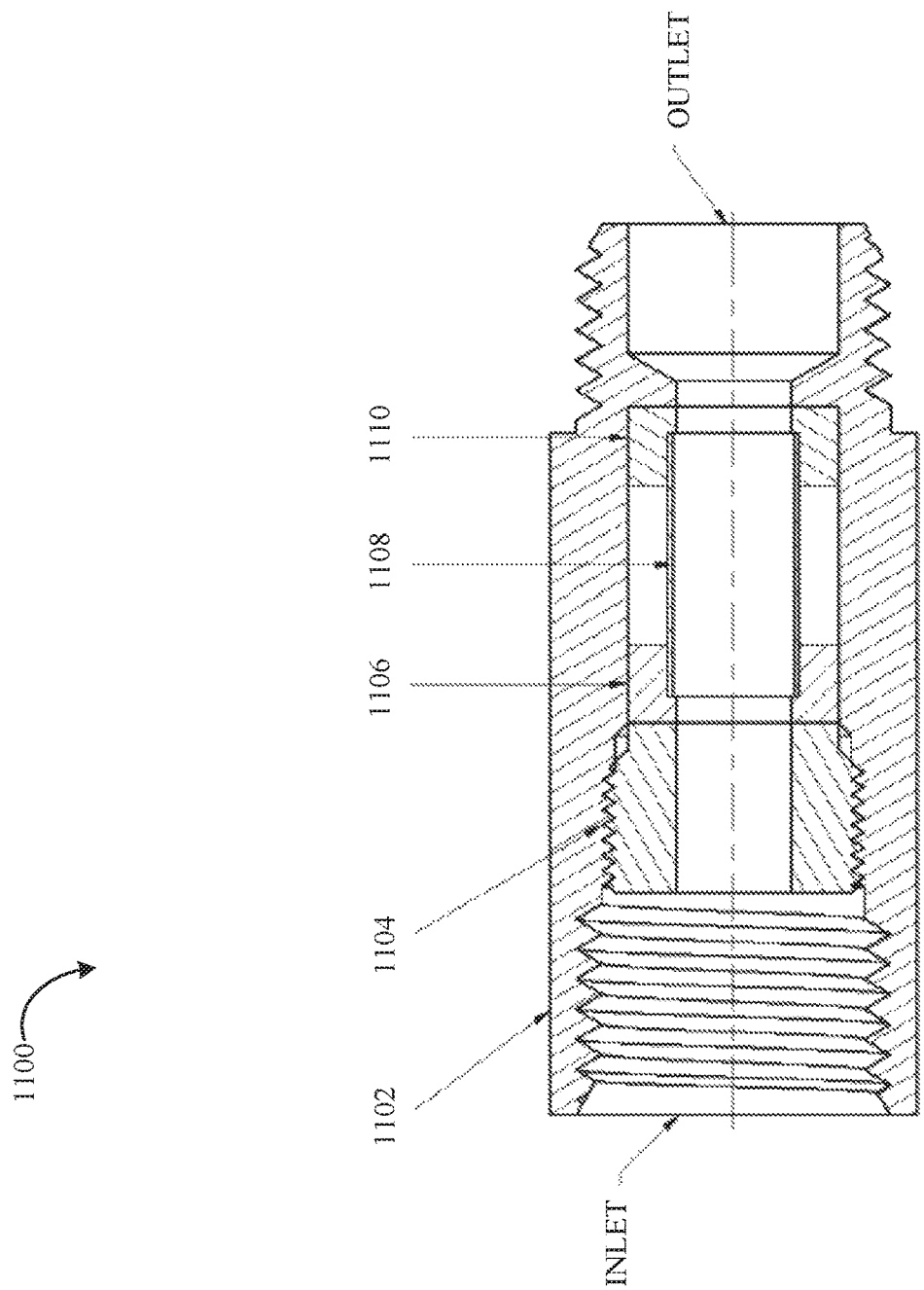
FIG. 11 illustrates an example device using a sensing element for in-line pressure sensing according to an embodiment of the disclosure.

FIG. 11 illustrates an example device 1100 using a thin-walled tube element for in-line pressure sensing according to an embodiment of the disclosure. The device 1100 includes a body 1102, a retainer 1104, a sensor housing 1106, a sensing element 1108 or sensor, and a sensor housing 1110. In an embodiment, as the device is exposed to liquid pressure (from Inlet to Outlet), the sensing element 1108 section will deflect and will output the system pressure, similar to the above descriptions, using some type of spray monitoring device.

Figure 12:
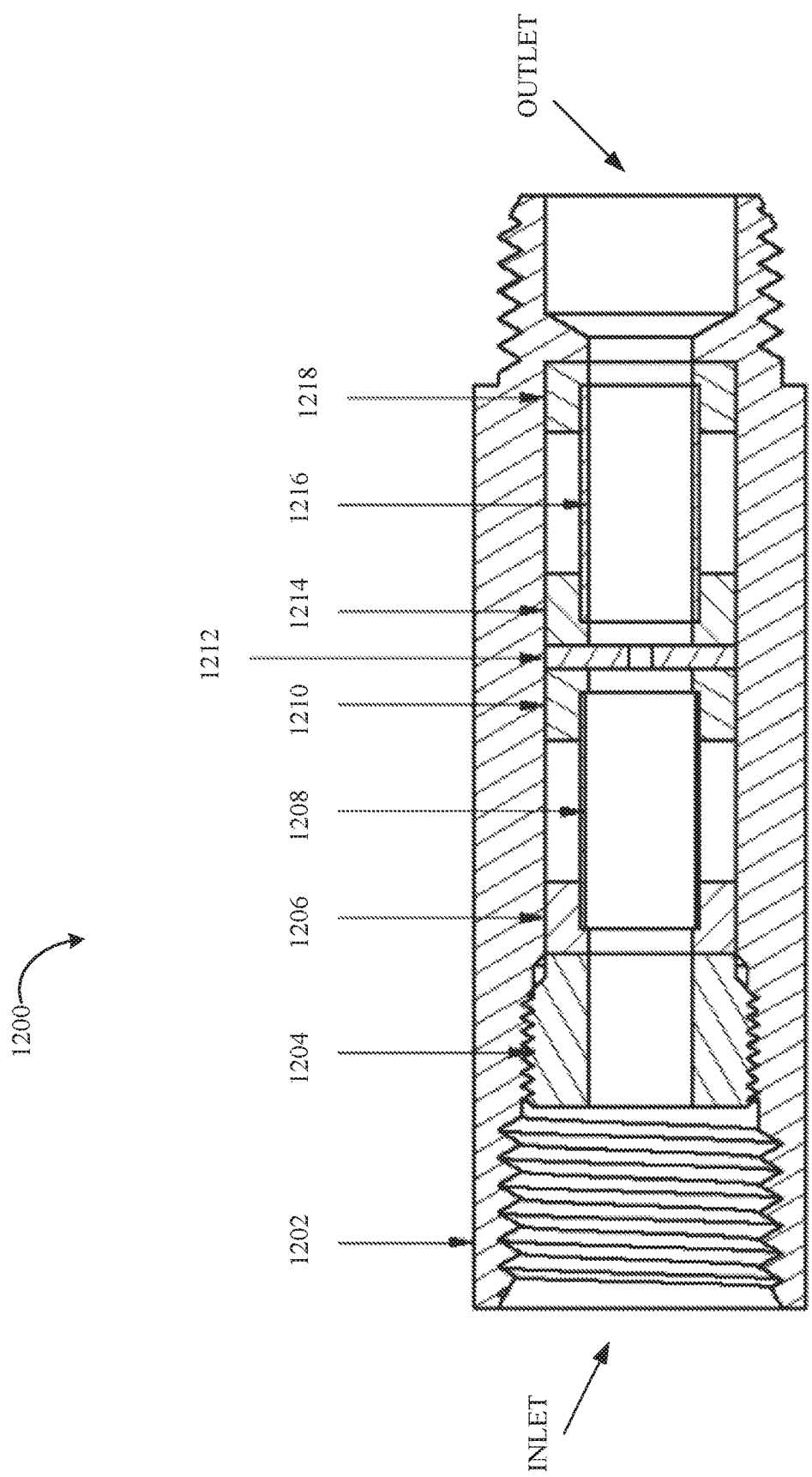
FIG. 12 illustrates an example device using two sensing elements for differential pressure sensing according to an embodiment of the disclosure.

FIG. 12 illustrates an example device 1200 using two thin-walled tube elements 1208 and 1216 for differential pressure sensing according to an embodiment of the disclosure. The device 1200 includes a body 1202, a retainer 1204, a sensor housing 1206, a sensing element 1208 or sensor, a sensor housing 1210, an orifice plate 1212, sensor housing 1214, another sensing element 1216 or sensor, and sensor housing 1218. In an embodiment, as pressurized liquid is supplied to the Inlet, the first sensing element 1208 will measure an initial pressure P1. The pressurized liquid will then pass through an opening in the orifice plate 1212, and the second sensing element 1216 will measure the second pressure P2 of the liquid. The difference between pressure measurements P2 and P1 across the orifice plate 1212 will be proportional to the flow rate of the pressurized liquid with respect to properties of the liquid.

Embodiments of the disclosure provide an actuating spray valve with an integrated sensor to measure spray instruction and spray signals, e.g., system spray pressure. Embodiments of the disclosure further provide a spray monitoring device that uses system inputs 116, user inputs 118, and performance inputs to verify whether the actuating spray valve is functioning correctly. Embodiments of the disclosure further provide communication between the spray device 102, spray controller 114 and/or factory operation systems, e.g., system controller 122.

Embodiments of the disclosure provide verification of spray device performance based on direct or indirect measurements of spray instruction signal, at each open and close event. The spray pressure is checked at a given time delay to validate a match in state, i.e., the valve is open and providing pressure when the spray instruction signal indicates open and the valve is closed and not providing pressure when the spray instruction signal indicates close.

Embodiments of the disclosure provide verification of spray device performance based on continuously monitor the spray instruction signal and spray pressure signal to monitor all timing markers for every spray cycle and verifying that the spray valve is actuating correctly. The timing characteristics can be tracked through the life of the valve. Spray instruction signal can be obtained from the kind of actuation and integrated with the other spray and systems controllers. For example, fluid pressure applied to a pneumatic or hydraulic valve can be obtained, electric signal applied to a solenoid or motor valve can be obtained, and indirect measurement of the magnetic field created by a solenoid coil can be obtained. The spray instruction signal can also be received from position measurement of a valve operator. The kind of valve can dictate the spray instruction signal being obtained.

Spray signal can be obtained from direct or indirect measurement of the fluid being sprayed. A piezo-resistive pressure sensor can be used for measuring the spray signal. The spray signal can also be measured with other sensor types, i.e., pressure of the fluid at the spray tip, mass or volumetric flow rate, reflective, proximity or radar sensing of spray. These and other signals may be used for further analyzing instantaneous performance of the actuating spray valve and tracking changes to predict performance and the life of the spray valve.

A monitoring system according to embodiments of the disclosure can include a spray valve being monitored, sensors and signal conditioning circuitry, cabling, micro-controller(s), communications hardware, power management circuitry, system integration and controls, and edge computing for tracking valve-to-valve performance in a large spraying system with multiple spray devices and to track performance throughout the life of the actuating spray valve. The communications hardware can include status indicators (HMIs, LEDs or other light indicators), serial data transmission, and/or wireless data transmission.

It will be appreciated that the described system allows for the efficient monitoring of the liquid flow of spray nozzles or spray devices. It will also be appreciated, however, that the foregoing methods and implementations are merely examples of the inventive principles, and that these illustrate only preferred techniques. It is thus contemplated that other implementations of the invention may differ in detail from the foregoing examples. Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

It will be understood that the use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:
1. A method for verifying spray performance of a pulse width modulated (PWM) cyclic spray device, the method comprising:
issuing a PWM cyclic spray actuation signal for actuating a spray valve within the PWM cyclic spray device;
receiving a spray sensing signal from a sensor of the spray device, wherein the spray sensing signal is indicative of an instantaneous flow from the PWM cyclic spray device; and
monitoring cyclic operation of the PWM cyclic spray device, wherein the monitoring comprises:
comparing a timing of state changes in the PWM cyclic spray actuation signal with corresponding state changes in the spray sensing signal; and
determining, in accordance with the comparing, operational performance of the PWM cyclic spray device.
2. The method according to claim 1, wherein the monitoring further comprises:
comparing a magnitude of the spray sensing signal to a threshold during an open state of the spray valve during a single PWM cycle of the PWM cyclic spray device.
3. The method according to claim 1, wherein the PWM cyclic spray actuation signal corresponds to one or more signal sources selected from the group consisting of:
a fluid pressure applied to a pneumatic or hydraulic valve;
a position measurement of a valve operator;
an electrical signal applied to a solenoid or motor valve; and
an indirect measurement of a magnetic field created by a solenoid coil.
4. The method according to claim 1, wherein the sensor of the spray device is any one or more sensor type selected from the group consisting of:
a piezo-resistive pressure sensor;
a pressure sensor;
a mass or volumetric flow rate sensor; and
a reflective, proximity or radar sensor.
5. The method according to claim 1, wherein the monitoring further comprises:
calculating, in accordance with the comparing, performance statistics of the spray valve.
6. The method according to claim 5, wherein the monitoring further comprises:
generating, in accordance with the performance statistics of the spray valve being out of tolerance, an error.
7. The method according to claim 1, wherein the monitoring comprises:
determining whether a decrease in the PWM cyclic spray actuation signal is accompanied by a corresponding decrease in the spray sensing signal; and
generating, in response to the decrease in the PWM cyclic spray actuation signal not being accompanied by the corresponding decrease in the spray sensing signal, a close error.
8. The method according to claim 7, wherein the monitoring further comprises:
determining, in response to the decrease in the PWM cyclic spray actuation signal being accompanied by the corresponding decrease in the spray sensing signal, the spray valve is stopping the liquid flow; and
calculating, based upon the determining the spray valve is stopping flow, performance statistics of the spray valve.
9. The method according to claim 8, wherein the monitoring further comprises:
generating, in response to the performance statistics of the spray valve being out of tolerance, an error.
10. A spraying system comprising:
a pulse width modulated (PWM) cyclic spray device, configured to generate and direct a liquid spray pattern, the spray device comprising:
a spray valve, configured to receive PWM cyclic spray actuation signal for actuating the spray valve, and
a sensor, configured to generate a spray sensing signal, wherein the spray sensing signal is indicative of an instantaneous flow from the PWM cyclic spray device; and
a controller configured to carry out a method comprising:
acquiring a spray sensing signal generated by a sensor of the spray device, wherein the spray sensing signal is indicative of an instantaneous flow from the PWM cyclic spray device; and
monitoring cyclic operation of the PWM cyclic spray device, wherein the monitoring comprises:
comparing a timing of state changes in the PWM cyclic spray actuation signal with corresponding state changes in the spray sensing signal; and
determining, in accordance with the comparing, operational performance of the PWM cyclic spray device.
11. The spraying system according to claim 10, wherein monitoring further comprises:
comparing a magnitude of the spray sensing signal to a threshold during an open state of the spray valve during a single PWM cycle of the PWM cyclic spray device.
12. The spraying system according to claim 10, wherein the sensor is a sensor type selected from the group consisting of:
a piezo-resistive pressure sensor;
a pressure sensor;
a mass or volumetric flow rate sensor; and
a reflective, proximity or radar sensor.
13. The spraying system according to claim 10, wherein the PWM cyclic spray actuation signal is received from one or more signal sources selected from the group consisting of:
a fluid pressure applied to a pneumatic or hydraulic valve;
position measurement of a valve operator;
electrical signal applied to a solenoid or motor valve; and
indirect measurement of a magnetic field created by a solenoid coil.
14. The system of claim 10, wherein the sensor of the spray device is configured to sense a pressure.
15. The system of claim 14, wherein the sensor is positioned to sense a pressure within the PWM cyclic spray device downstream from the spray valve.
16. The system of claim 10, wherein the comparing a timing of state changes includes determining a delay between state changes of the PWM cyclic spray actuation signal and corresponding state changes in the spray sensing signal.
17. The system of claim 10, wherein the PWM cyclic spray device is an electrical power-actuated spray device.
18. The method of claim 1, wherein the sensor of the spray device is configured to sense a pressure.
19. The method of claim 18, wherein the sensor is positioned to sense a pressure within the PWM cyclic spray device downstream from the spray valve.

20. The method of claim 1, wherein the comparing a timing of state changes includes determining a delay between state changes of the PWM cyclic spray actuation signal and corresponding state changes in the spray sensing signal.

21. The method of claim 1, wherein the PWM cyclic spray device is an electrical power-actuated spray device.

\* \* \* \* \*